(12) United States Patent
Merritt

(10) Patent No.: US 8,673,043 B2
(45) Date of Patent: Mar. 18, 2014

(54) FLUID FILTER

(75) Inventor: Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

(21) Appl. No.: 13/613,574

(22) Filed: Sep. 13, 2012

(65) Prior Publication Data

US 2013/0000267 A1   Jan. 3, 2013

Related U.S. Application Data

(63) Continuation of application No. PCT/US2011/028491, filed on Mar. 15, 2011.

(60) Provisional application No. 61/314,747, filed on Mar. 17, 2010.

(51) Int. Cl.

| | | |
|---|---|---|
| *B01D 39/14* | (2006.01) | |
| *B01D 39/06* | (2006.01) | |
| *B01D 24/00* | (2006.01) | |
| *B01D 50/00* | (2006.01) | |
| *B01D 39/00* | (2006.01) | |
| *B01D 46/00* | (2006.01) | |

(52) U.S. Cl.
USPC .......... 55/502; 55/522; 55/523; 55/524; 422/169; 422/170; 422/171; 422/172; 422/177; 422/178; 422/180; 422/181; 422/182; 422/179

(58) Field of Classification Search
USPC ............. 55/502, 522–524; 422/169–172, 422/177–182
See application file for complete search history.

(56) References Cited

U.S. PATENT DOCUMENTS

| | | | |
|---|---|---|---|
| 4,155,980 A * | 5/1979 | Santiago et al. | ............ 422/180 |
| 5,772,883 A | 6/1998 | Rothman et al. | |
| 5,792,247 A | 8/1998 | Gillingham et al. | |
| 5,820,646 A | 10/1998 | Gillingham et al. | |
| 5,895,574 A | 4/1999 | Friedmann et al. | |
| 5,902,364 A | 5/1999 | Tokar et al. | |
| 6,179,890 B1 | 1/2001 | Ramos et al. | |
| D437,402 S | 2/2001 | Gieseke et al. | |
| 6,190,432 B1 | 2/2001 | Gieseke et al. | |
| 6,235,195 B1 | 5/2001 | Tokar | |
| D450,827 S | 11/2001 | Gieseke et al. | |
| D450,828 S | 11/2001 | Tokar | |
| 6,348,084 B1 | 2/2002 | Gieseke et al. | |
| 6,368,374 B1 | 4/2002 | Tokar et al. | |

(Continued)

FOREIGN PATENT DOCUMENTS

| | | |
|---|---|---|
| DE | 202006001440 U1 | 7/2007 |
| WO | WO 2005/058461 A1 | 6/2005 |

(Continued)

OTHER PUBLICATIONS

U.S. Appl. No. 13/613,685, filed Sep. 13, 2012, Merritt.

*Primary Examiner* — Amber Orlando
(74) *Attorney, Agent, or Firm* — Reinhart Boerner Van Deuren P.C.

(57) ABSTRACT

A straight through flow filter element is provided in which the seal and/or seal support may be arranged to be generally flush with the flow face of the filter media pack. In some embodiments, long filter media packs may be facilitated. Additionally, certain processing advantages in simplicity of molding a seal on the support can be accomplished.

21 Claims, 8 Drawing Sheets

(56) References Cited

U.S. PATENT DOCUMENTS

| | | | |
|---|---|---|---|
| D460,169 S | 7/2002 | Anderson et al. | |
| 6,416,605 B1 | 7/2002 | Golden | |
| 6,517,598 B2 | 2/2003 | Anderson et al. | |
| 6,533,845 B2 | 3/2003 | Tokar et al. | |
| D473,637 S | 4/2003 | Golden | |
| 6,610,126 B2 | 8/2003 | Xu et al. | |
| D484,584 S | 12/2003 | Anderson et al. | |
| 6,673,136 B2 | 1/2004 | Gillingham et al. | |
| 6,783,881 B2 | 8/2004 | Stenersen et al. | |
| 6,852,141 B2 | 2/2005 | Bishop et al. | |
| 6,966,940 B2 | 11/2005 | Krisko et al. | |
| 7,008,465 B2 | 3/2006 | Graham et al. | |
| 7,179,317 B2 | 2/2007 | Chung et al. | |
| 7,255,300 B2 | 8/2007 | Johnston | |
| 7,261,756 B2 | 8/2007 | Merritt | |
| 7,282,075 B2 | 10/2007 | Sporre et al. | |
| 7,318,851 B2 | 1/2008 | Brown et al. | |
| 7,323,029 B2 | 1/2008 | Engelland et al. | |
| 7,329,326 B2 | 2/2008 | Wagner et al. | |
| 7,364,601 B2 | 4/2008 | Xu et al. | |
| 7,396,375 B2 | 7/2008 | Nepsund et al. | |
| 7,396,376 B2 | 7/2008 | Schrage et al. | |
| 7,488,365 B2 | 2/2009 | Golden et al. | |
| 7,491,254 B2 * | 2/2009 | Krisko et al. | 55/337 |
| 7,569,090 B2 | 8/2009 | Nelson | |
| 7,625,419 B2 | 12/2009 | Nelson et al. | |
| 7,655,074 B2 | 2/2010 | Nepsund et al. | |
| 7,674,308 B2 | 3/2010 | Krisko et al. | |
| 7,682,416 B2 | 3/2010 | Engelland et al. | |
| 7,713,321 B2 | 5/2010 | Kuempel et al. | |
| 7,736,410 B2 | 6/2010 | Kuempel et al. | |
| 7,905,936 B2 | 3/2011 | Coulonvaux et al. | |
| 7,909,954 B2 | 3/2011 | Johnston et al. | |
| 7,959,701 B2 | 6/2011 | Merritt | |
| 7,959,703 B2 | 6/2011 | Merritt et al. | |
| 8,042,694 B2 | 10/2011 | Driml et al. | |
| 8,092,748 B2 * | 1/2012 | Forster et al. | 422/177 |
| 8,101,003 B2 * | 1/2012 | Krisko et al. | 55/502 |
| 8,172,920 B2 | 5/2012 | Merritt | |
| 8,177,877 B2 | 5/2012 | Merritt et al. | |
| 8,277,531 B2 | 10/2012 | Brown et al. | |
| 2001/0036427 A1 * | 11/2001 | Yamada et al. | 422/179 |
| 2005/0208348 A1 | 9/2005 | Canepa | |
| 2006/0090431 A1 | 5/2006 | Brown | |
| 2006/0090434 A1 | 5/2006 | Brown et al. | |
| 2006/0091061 A1 | 5/2006 | Brown | |
| 2006/0091064 A1 | 5/2006 | Brown et al. | |
| 2006/0091084 A1 | 5/2006 | Merritt et al. | |
| 2006/0163150 A1 | 7/2006 | Golden et al. | |
| 2006/0186031 A1 | 8/2006 | Fick et al. | |
| 2007/0039296 A1 | 2/2007 | Schrage et al. | |
| 2007/0169449 A1 | 7/2007 | Merritt | |
| 2007/0186528 A1 | 8/2007 | Wydeven et al. | |
| 2007/0193236 A1 | 8/2007 | Merritt | |
| 2008/0000826 A1 | 1/2008 | Harder et al. | |
| 2008/0016832 A1 | 1/2008 | Krisko et al. | |
| 2008/0060329 A1 * | 3/2008 | Brown et al. | 55/498 |
| 2008/0110142 A1 | 5/2008 | Nelson et al. | |
| 2008/0135470 A1 | 6/2008 | Merritt et al. | |
| 2008/0135471 A1 | 6/2008 | Merritt et al. | |
| 2008/0250763 A1 | 10/2008 | Widerski et al. | |
| 2008/0250766 A1 | 10/2008 | Schrage et al. | |
| 2008/0276582 A1 | 11/2008 | Boehrs et al. | |
| 2008/0282890 A1 | 11/2008 | Rocklitz et al. | |
| 2009/0014375 A1 | 1/2009 | Savage et al. | |
| 2009/0064646 A1 | 3/2009 | Reichter et al. | |
| 2009/0114590 A1 | 5/2009 | Merritt et al. | |
| 2009/0127211 A1 | 5/2009 | Rocklitz et al. | |
| 2009/0145093 A1 | 6/2009 | Krisko et al. | |
| 2009/0151311 A1 | 6/2009 | Reichter | |
| 2009/0211450 A1 | 8/2009 | Mosset et al. | |
| 2009/0211696 A1 | 8/2009 | Moe et al. | |
| 2009/0223187 A1 | 9/2009 | Nelson et al. | |
| 2009/0229458 A1 | 9/2009 | Feddersen et al. | |
| 2009/0320423 A1 | 12/2009 | Merritt et al. | |
| 2009/0320424 A1 | 12/2009 | Merritt et al. | |
| 2010/0000934 A1 | 1/2010 | Brown | |
| 2010/0032365 A1 | 2/2010 | Moe et al. | |
| 2010/0043366 A1 | 2/2010 | Boehrs et al. | |
| 2010/0078379 A1 | 4/2010 | Rocklitz | |
| 2010/0146919 A1 | 6/2010 | Nelson et al. | |
| 2010/0192530 A1 | 8/2010 | Wydeven et al. | |
| 2010/0233048 A1 | 9/2010 | Dallas et al. | |
| 2010/0242425 A1 | 9/2010 | Swanson et al. | |
| 2010/0263337 A1 | 10/2010 | Raether et al. | |
| 2010/0293906 A1 | 11/2010 | Flagstad et al. | |
| 2011/0041692 A1 | 2/2011 | Raether | |
| 2011/0042295 A1 | 2/2011 | Merritt | |
| 2011/0072972 A1 | 3/2011 | Raether et al. | |
| 2011/0078985 A1 | 4/2011 | Belcher et al. | |
| 2011/0083559 A1 | 4/2011 | Raether | |
| 2011/0197556 A1 | 8/2011 | Brown et al. | |
| 2012/0000170 A1 | 1/2012 | Brown et al. | |
| 2012/0205305 A1 | 8/2012 | Brown et al. | |

FOREIGN PATENT DOCUMENTS

| | | |
|---|---|---|
| WO | WO 2005/077487 A1 | 8/2005 |
| WO | WO 2005/082484 A1 | 9/2005 |
| WO | WO 2006/014941 A2 | 2/2006 |
| WO | 1 850 941 A2 | 8/2006 |
| WO | WO 2007/009039 A1 | 1/2007 |
| WO | 1 976 615 A2 | 8/2007 |
| WO | WO 2008/045325 A2 | 4/2008 |
| WO | WO 2009/012189 A2 | 1/2009 |
| WO | WO 2009/039285 A1 | 3/2009 |
| WO | WO 2009/059177 A1 | 5/2009 |
| WO | WO 2009/100115 A2 | 8/2009 |
| WO | WO 2009/124284 A2 | 10/2009 |
| WO | WO 2010/011628 A2 | 1/2010 |
| WO | WO 2010/025385 A1 | 3/2010 |
| WO | WO 2010/054218 A1 | 5/2010 |
| WO | WO 2010/083194 A2 | 7/2010 |
| WO | WO 2010/114911 A1 | 10/2010 |
| WO | WO 2010/117606 A2 | 10/2010 |
| WO | WO 2011/017352 A2 | 2/2011 |
| WO | WO 2011/076586 A1 | 6/2011 |
| WO | WO 2011/115973 A2 | 9/2011 |
| WO | WO 2011/115979 A2 | 9/2011 |

* cited by examiner

FLUID FILTER

CROSS-REFERENCE TO RELATED PATENT APPLICATIONS

This patent application is a continuation of co-pending PCT/US2011/028491, filed Mar. 15, 2011, designating the United States, which claims the benefit of U.S. Provisional Patent Application No. 61/314,747, filed Mar. 17, 2010, the entire teachings and disclosure of which are incorporated herein by reference thereto.

FIELD OF THE INVENTION

This invention relates generally to fluid filters and more particularly to the sealing systems of such fluid filters and particular inline straight through flow filter media packs including fluted filter media packs.

BACKGROUND OF THE INVENTION

Filters of the type used for filtering particulate matter from fluids sometimes include a filter housing having an inlet for receiving the fluid entrained with particulate matter and an outlet for delivering the filtered fluid to a device needing fluid that is free of particulate matter. For example, a filter may be provided at the air inlet of an engine, a cabin ventilation system, an air compressor, an HVAC system, and industrial air collection system or the like to remove dust or other particulate matter that could cause damage.

In such filters, the particulate matter is typically removed by a filter element that is removably installed within the filter housing in such a manner that the fluid must flow first through a filter element. In some systems, the filter element is simply placed between upstream and downstream duct sections. In either case, the filter element may or may not include its own housing. In either case and over time, the filter pack of the filter element becomes plugged or coated with particulate matter, necessitating removal and replacement of the filter element in order for the filter to continue in its function of supplying particulate free fluid to the given application.

There is also known in the art to use a variety of different filter packs included pleated filter packs and fluted filter packs, both of which can be configured as a straight through flow type filter pack. For example, a fluted filter media has opposed inlet and outlet flow faces and an outer peripheral surface extending between the inlet and outlet faces. The fluted filter media comprises multiple flutes extending between the inlet and outlet flow faces with alternating flutes being closed at either the inlet or outlet ends such that some flutes are open at the inlet face and closed at the outlet face while other flutes are open at the outlet face and closed at the inlet face. In this manner, fluid is forced to traverse through the filter media as the fluid flows from the inlet face to the outlet face. Examples of such fluted filter media arrangements and filter elements incorporating the same are shown, for example in U.S. Pat. No. 7,318,851 and Publication Nos. US/2007/0186528; 2007/0193236; and US/2006/0091061, all assigned to the present assignee, and all of which have disclosures which are hereby incorporated by reference in their entirety to the extent not inconsistent with the present disclosure. Details therein can be applicable or combined with the disclosed embodiments herein.

Often times, in an existing application there is already an existing envelope in which a filter element must reside and sealed against. Accordingly, some filter element designs may be required to fit a given envelope size. Additionally, in some cases, it may be desirable for a given filter element to fit or seal against different housing or application arrangements. While various filter element and sealing system arrangements are known generally within the prior art, the present invention is directed toward various improvements.

BRIEF SUMMARY OF THE INVENTION

One aspect of the present invention is directed toward an improvement on a seal member and seal support ring arrangement for a straight through flow filter (where the fluid generally is not redirected) such as a fluted filter element or alternatively a pleated panel filter. The filter element comprises a fluted filter media having inlet and outlet flow faces on opposed ends thereof and an outer peripheral surface extending between opposed ends. The fluted filter media comprises a plurality of flutes extending between inlet and outlet flow faces with portions of flutes being closed such that fluid transfers through the filter media as fluid flows from the inlet flow face to the outlet flow face. A pre-formed seal support ring (which may be formed from such materials as plastic or metal) surrounds the outer peripheral surface. This ring has a terminating end surface that is generally flush with one of the inlet and outlet flow faces. This ring is also generally confined between the inlet and outlet flow faces such that the seal support ring does not extend over the inlet or outlet flow faces. Seal member is molded onto the seal support ring.

Another aspect of the present invention is directed toward a method of making such a filter element. The method comprises forming a straight through flow filter such as a fluted filter media pack (or pleated pack) having inlet and outlet flow faces on opposed ends thereof and an outer peripheral surface extending between opposed ends. The fluted filter media comprises a plurality of flutes extending between the inlet and outlet flow faces with portions of the flutes being closed such that fluid transverses through the filter media as fluid flows from the inlet flow face to the outlet flow face. The method also comprises molding a seal member on a seal support ring such that the seal member is generally flush with the terminating end of the support ring; and arranging a filter media pack within the seal support ring such that the seal support ring extends over the outer peripheral surface until the terminating end of the support ring co-locates along a flat surface to be generally flush with one of the inlet and outlet flow faces. Additionally, the method contemplates affixing the seal support ring to the outer peripheral surface of the fluted filter media pack.

It may be a subsidiary feature according to this methodology that the molding may be conducted prior to the arranging and the fixing may be conducted after the arranging and other sequences may be performed.

A further aspect of the present invention is directed toward an improved arrangement between a seal and a straight through flow filter such as fluted filter element (or pleated filter pack) in which a seal may be molded onto a seal support ring, but yet may be arranged generally flush with one of the inlet and outlet flow faces of a fluted filter media. According to this aspect, a filter element comprises a fluted filter media similar to either of the aspects above. A pre-formed seal support ring surrounds the outer peripheral surface of the fluted filter media. A seal support ring may be generally confined between the inlet and outlet flow faces such that the seal support ring does not extend over either the inlet or outlet flow faces. The seal member is molded onto the support ring with the seal member having a terminating seal surface that is generally flush with one of the inlet and outlet flow faces. The seal member surrounds the outer peripheral surface of the fluted filter media.

Seal members of the various concepts disclosed herein may be either of the type that are radial or axial seals or a combination thereof.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The first embodiment is illustrated in FIGS. 1-5. As shown therein, an inline straight through flow type filter element such as a fluted filter element 10 can be mounted at least partially within a housing 12. As shown, the housing 12 may be an existing housing for engines and as such has a given or fixed envelope size, a predetermined sealing interface, as well as a fixed mounting structure. As such, the filter element 10 is designed to utilize this given mounting structure, sealing interface, and pre-determined envelope.

Figure 3:
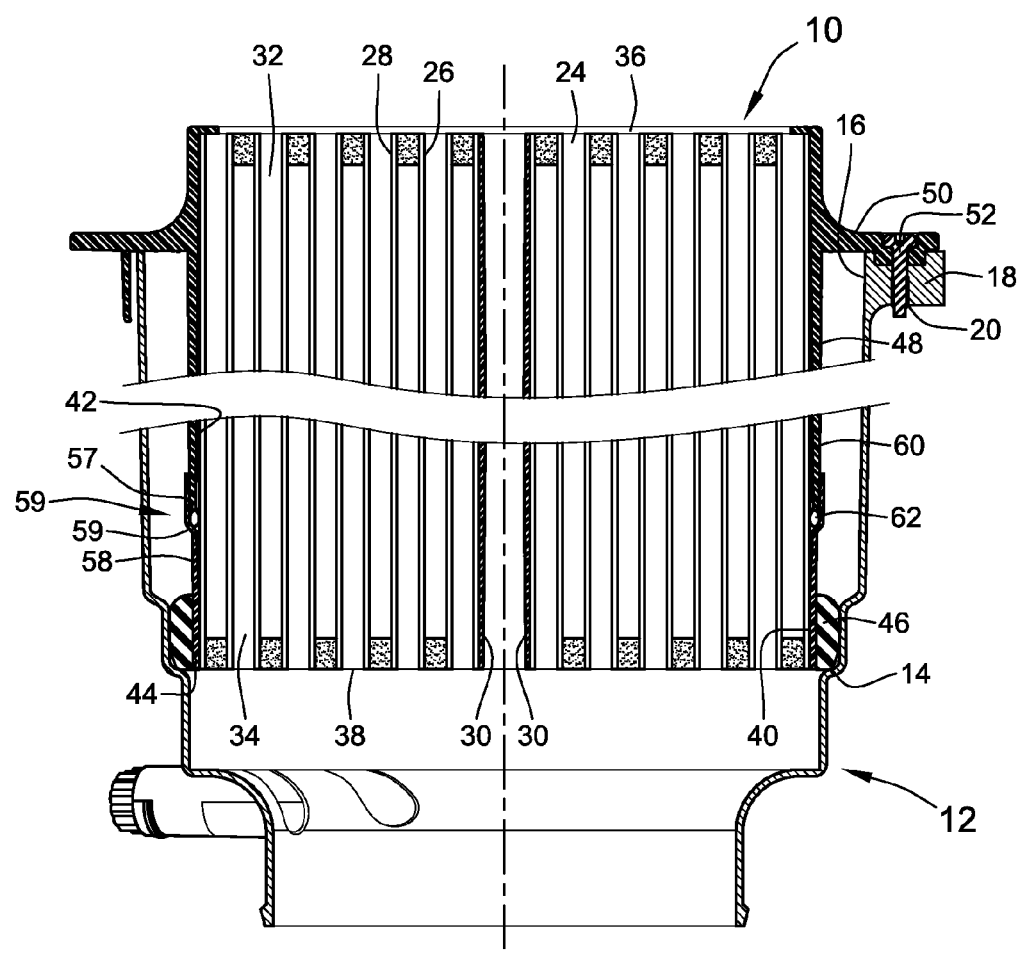
FIG. 3 is a cross section of a filter element and housing combination using the filter element of FIG. 1.

As shown in FIG. 3, the housing 12 includes an internal annular housing sealing surface 14 against which the filter element 10 may seal through compression of the seal material between the filter element and the housing. In this instance, the housing sealing surface 14 is such that the filter element 10 may form a radial seal therewith, but it may also or alternatively axially seal. As shown, the housing sealing surface 14 may also be disposed radially inward from the inner perimeter of the upper end or upper opening 16 of the housing 12 into which the filter element 10 may be installed and removed. Additionally, it can be seen that the housing 12 includes a corresponding mounting structure 18 with apertures 20 to facilitate fastening of the filter element 10 to the housing 12.

As shown, the filter element 10 includes a straight through flow filter media such as a fluted filter media pack 24, although it is equally applicable to other such inline flow filters such as a pleated filter pack to include panel filters and the like, which may have various annular shapes, which herein is meant to be broad to include oval, racetrack, round, oblong and even rectangular in that it forms a continuous loop. The filter element 10 preferably employs fluted filter media which is known to provide increased capacity in a given envelope.

Figure 1:
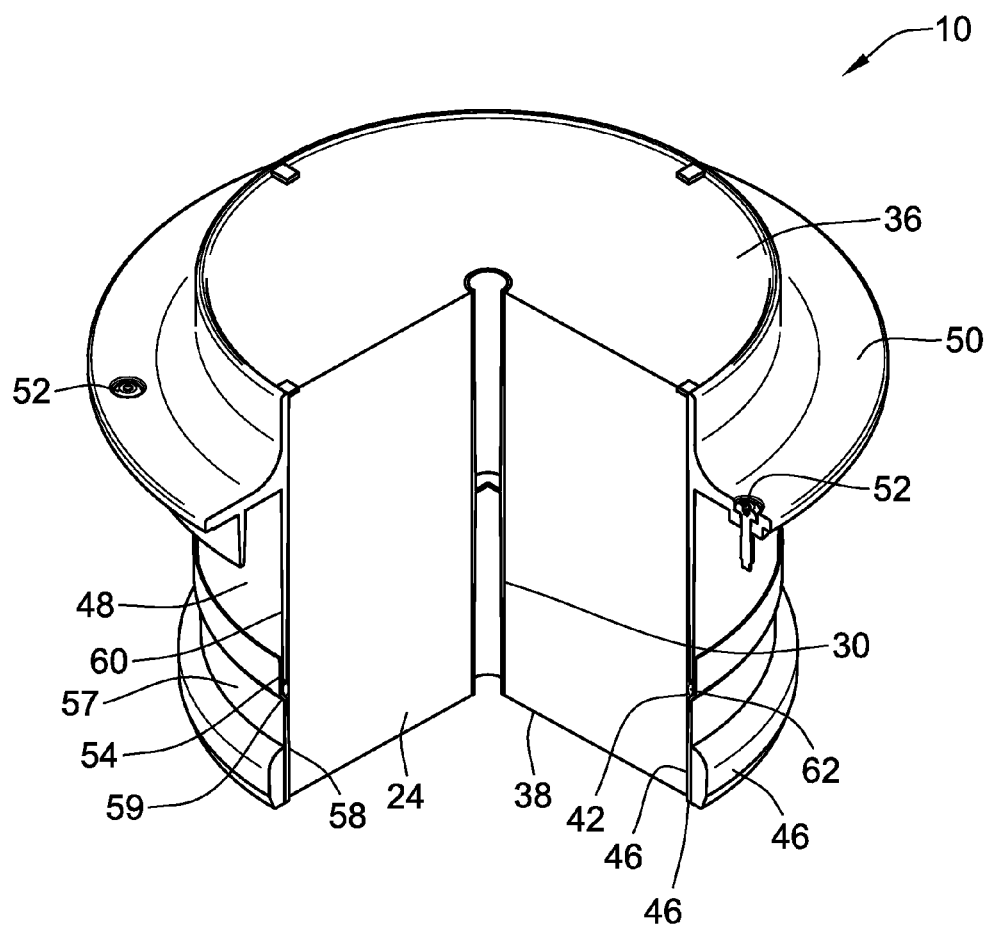
FIG. 1 is an isometric and partially cut cross-sectional view of a filter element according to a first embodiment of the present invention.
Figure 2:
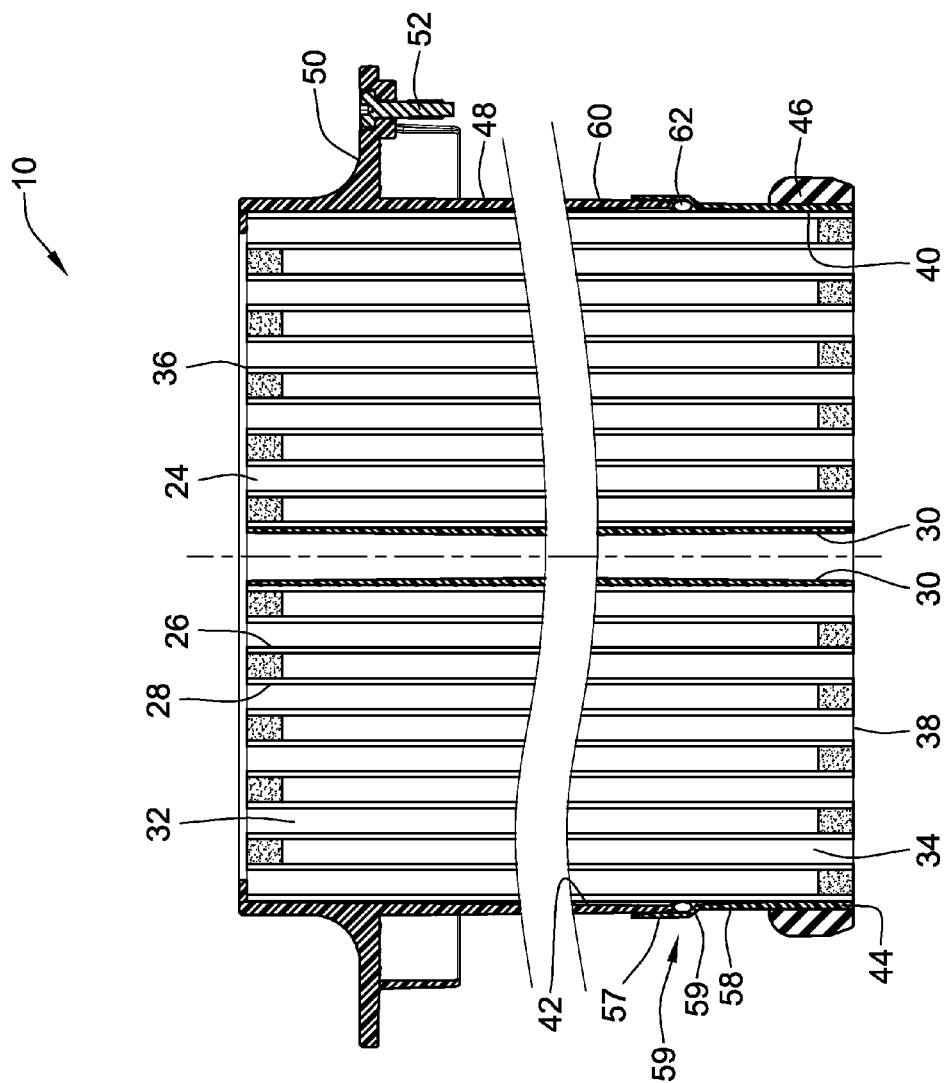
FIG. 2 is a cross-sectional view of the filter element shown in FIG. 1.

In this regard and according to certain embodiments, fluted filter media pack 24 includes a base sheet 26 and a fluted sheet 28 secured together and wound about a winding core 30 to provide a plurality of flutes including inlet flutes 32 and outlet flutes 34 that extend between inlet and outlet flow faces 36, 38. As shown, the inlet flutes are open at the inlet flow face 36 and closed at the outlet flow face; while the outlet flutes 34 are closed at the inlet flow face 36 and open at the outlet flow face 38. In this manner, fluid entering the inlet flow face enters the inlet flow face and must traverse through the filter media (either the base sheet or the fluted sheet) as fluid flows from the inlet flow face to the outlet flow face. As a consequence of flowing through the filter media of either the fluted sheet or base sheet, particulate matter, such as dust and the like is thereby removed from the fluid stream. For example, dust or the like in an air flow stream will then be trapped in the filter media of either the base sheet or the fluted sheet. As shown in FIG. 1, the fluted filter media pack 24 may be generally circular, but other shapes for the first embodiment may be contemplated including such as the oval or race-track shape shown in another embodiment (see e.g. FIGS. 7-8) in which other structures similarly associated with FIG. 1 would take a similar shape.

The filter element 10 additionally includes a pre-formed seal support ring that may be formed from such material as plastic (such as glass-filled nylon) or other such materials such as metal. The material of the support ring is therefore generally rigid as opposed to compressible or elastic (as in the case of the seal material). By pre-formed, it is meant that the support ring is not formed in place on the fluted filter media, but formed separately and apart therefrom and then attached such as by gluing or by such means as using a portion of the seal member itself to attach the support ring.

As shown in the drawings, the support ring 40 surrounds the outer annular peripheral surface 42 of the fluted filter media pack 24. The support ring 40 has a terminating end surface 44 that is generally flush (e.g. flush or almost flush) with one of the inlet and outlet flow faces 36, 38. As also shown, the seal support ring is confined between the inlet and outlet flow faces and does not extend over either of the inlet or outlet flow faces. In this manner, the flow of fluid from the filter pack is unimpeded and does not impact upon the support ring. Additionally, there is material savings by confining the support ring to between the opposed outlet and inlet flow faces. Additionally, the fluted filter media pack can additionally be lengthened to take full advantage of the entire length of the overall housing, which in some cases may provide for increased media for the given envelope size. Thus, a longer fluted filter media pack 24 may be employed in some circumstances.

Additionally, a seal member is molded onto the seal support ring 40. The seal member 46 circumscribes and surrounds the support ring 40 and is positioned for engaging the housing sealing surface 14. Seal member 46 is preferably formed from foamed urethane material, but may alternatively be formed from other rubber-like elastic materials such as Neoprene, gasketing material and the like.

Preferably the seal member 46, according to some embodiments, may be generally flush with the terminating end surface 44 of the support ring 40. By "generally flush" it is meant that some deviation therefrom is permitted as it will be understood that such things as mold flash and the like would be permissible over the terminating end surface—and hence includes flush or almost flush. Likewise, the seal member 46 is generally flush or perhaps recessed slightly from one of the inlet and outlet flow faces.

Another advantage of this design is that a mounting shell 48 may be located off of the support ring 40. Mounting shell 48, shown in this embodiment, also surrounds the outer periphery surface 42 of the fluted filter media pack 24 and includes an outward flange 50 with fasteners 52 that are adapted to interact with the mounting structure 18 and apertures 20 of the housing 12. As shown, the mounting shell 48 can be located off of and secured to the pre-formed seal support ring 40 at an interface 54 at the outlet end of the fluted filter media pack 24.

This securement interface 54 preferably includes an enlarged guide-in on the support ring 40 with larger and smaller perimeter/diameter segments 57, 58 joined by a radially offset segment 59. In this manner, the mounting shell 48 and sleeve portion 60 thereof may telescopically interfit within and inside of the larger segment 57. A glue or adhesive bead such as made by urethane, bonding agent or the like at 62 thereby secures both of the mounting shell 48 and the support ring 40 together and along with the fluted filter media pack 24. Preferably, the annular glue bead is laid along the inner surface of the seal support ring but may also be laid on the outer surface of the mounting shell 48.

Other interfitting arrangements, of course, are possible to include a situation where a portion of the mounting shell would extend over the outer perimeter of the support ring 40 and only be attached to the support ring with the support ring being independently secured to the fluted filter media pack. Such that other interfacing arrangements are contemplated and possible.

Figure 6:
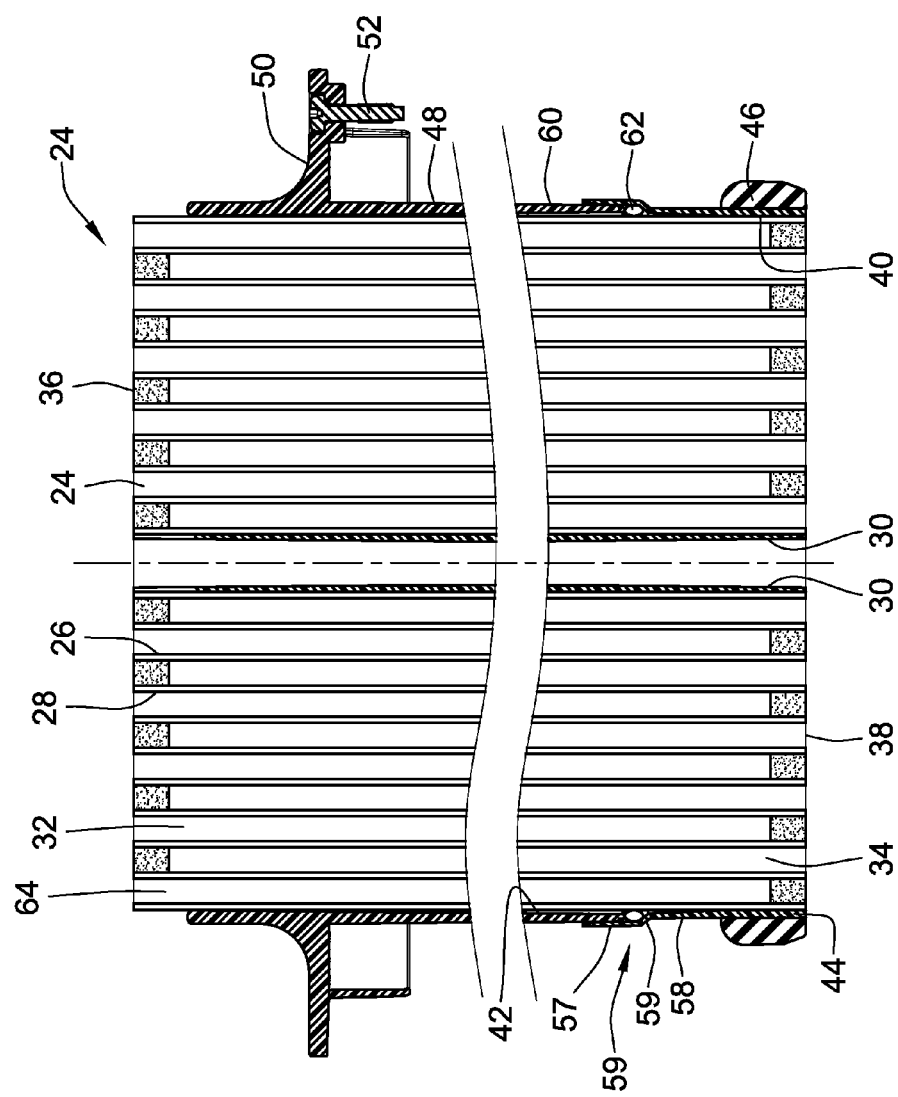
FIG. 6 is a cross section of a filter element similar to FIG. 1 but according to another embodiment with a longer extended filter pack extending beyond the housing mount structure to provide increased filtration capacity.

As shown, the inlet flow face 36 may rest slightly below mounting location tabs extending from the mounting shell over the inlet flow face. However, more preferably as shown in the alternative embodiment of FIG. 6, the upper end 64 of the fluted filter media pack 24 extends above the mounting shell 48 to ensure maximum utilization of length and increasing filter media and filtration capacity. This also ensures that the location of the mounting shell is strictly by means of the location off of the support ring 40 as shown in this embodiment. As a consequence, the corresponding flange 50 is located precisely relative to the support ring 40 and seal member 46 thereby controlling without much intervening structure and axial distance therebetween.

Figure 4:
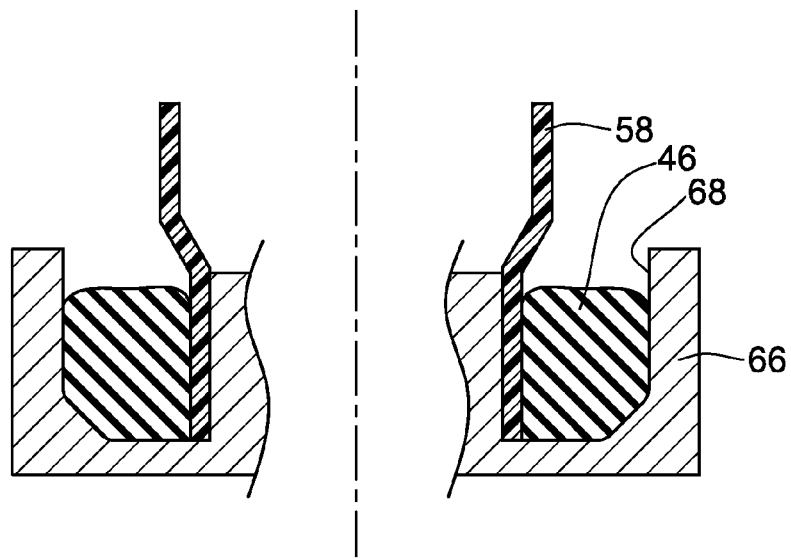
FIG. 4 a cross section of seal support ring and sealing mold for forming a seal on the seal support ring according to one embodiment of a method of forming the seal.
Figure 5:
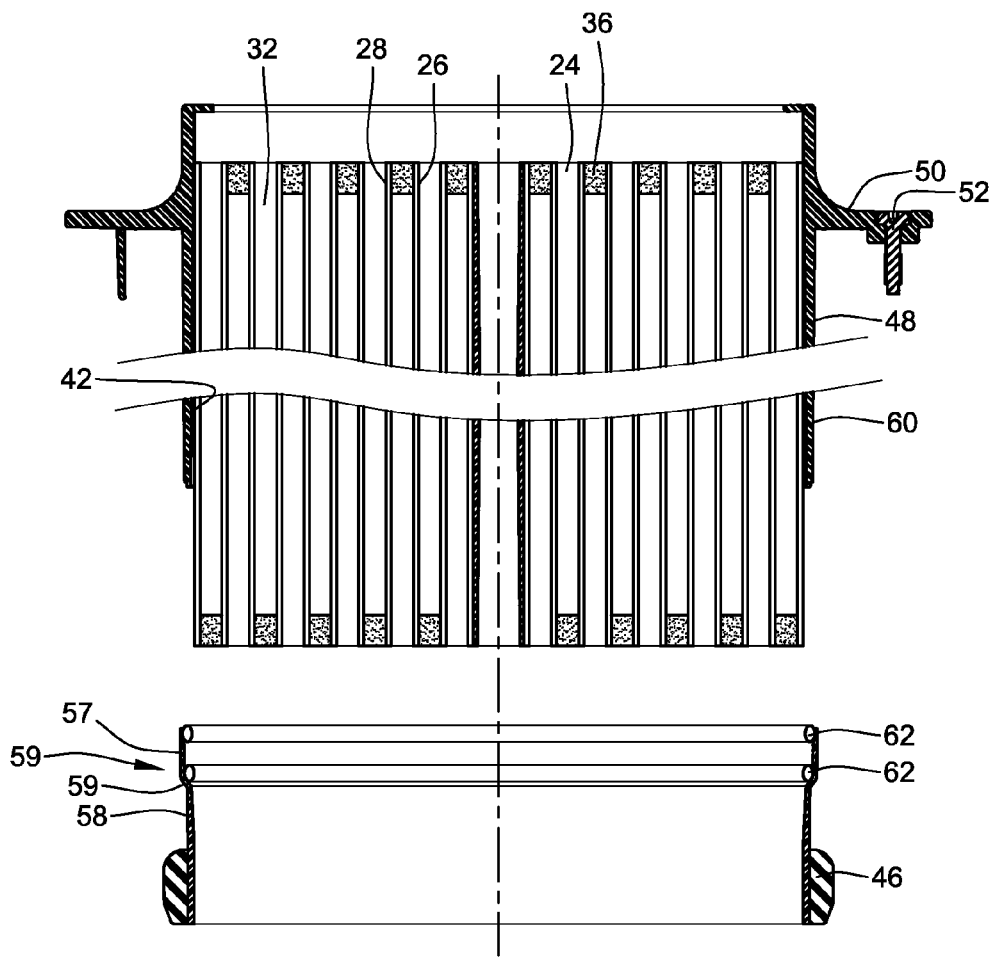
FIG. 5 is an exploded assembly view in cross section of the filter element according to FIG. 1.

The methodology for molding the seal member and assembling the filter element is shown, for example, in FIGS. 4-5. Referring to therein, the fluted filter media pack is formed in a relatively conventional manner, such as by coiling up the fluted sheet and flat base sheet with opposed beads of seal material on either end. The seal is molded onto a seal support ring preferably prior to attachment to the filter media pack. The seal member is molded onto the support ring with a suitable mold 66 having an annular molding cavity 68 that permits the free rise of the urethane material used to form the seal member. As shown, the molding can be accomplished by first placing the seal support ring 40 (preferably without the filter media pack, although the filter media pack may also be pre-attached to the seal support ring) and placing the seal support ring within the annular molding cavity 68 of the mold 66. Thereafter, the uncured urethane material is poured into the molding cavity 68, in this case on the outside of the support ring 40 (but in alternative embodiments it could be on the internal surface of the support ring), such that the seal member 46 is allowed to form by free-rising through the urethane material to take the form of the molding cavity 68 and have a generally flush surface with the terminating end 44 of the support ring 40 as these two components are located or formed by the bottom surface of the molding cavity 68.

If the filter media pack is not pre-attached to the support ring, then the filter media pack is assembled by arrangement within the support ring. The guide end at 56 helps facilitate installation of the fluted filter media pack 24 for reception into the support ring 40. A circular bead of adhesive such as glue, urethane or the like at 62 can then be received into the larger segment 57 as there is a natural cavity for reception of the same, which facilitates affixing the seal support ring to the outer peripheral surface of the fluted filter media pack at the outlet end of the media pack. Prior to curing of this adhesive 62, the mounting shell 48 may then be telescopically received and secured into engagement with the adhesive 62 to locate the mounting shell and attach the mounting shell 48 to the support ring 40.

Figure 7:
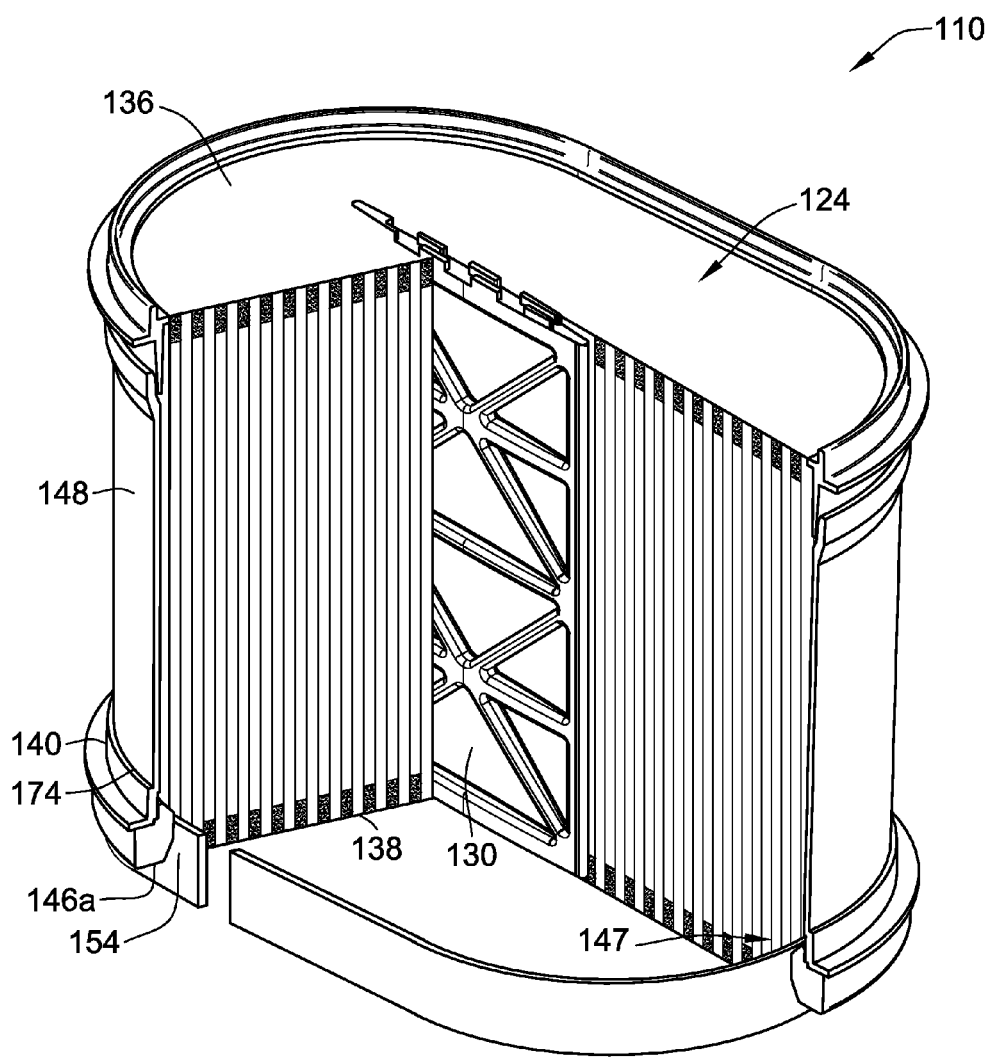
FIG. 7 is an isometric and partially cut cross-sectional view of a filter element according to another embodiment of the present invention.
Figure 8:
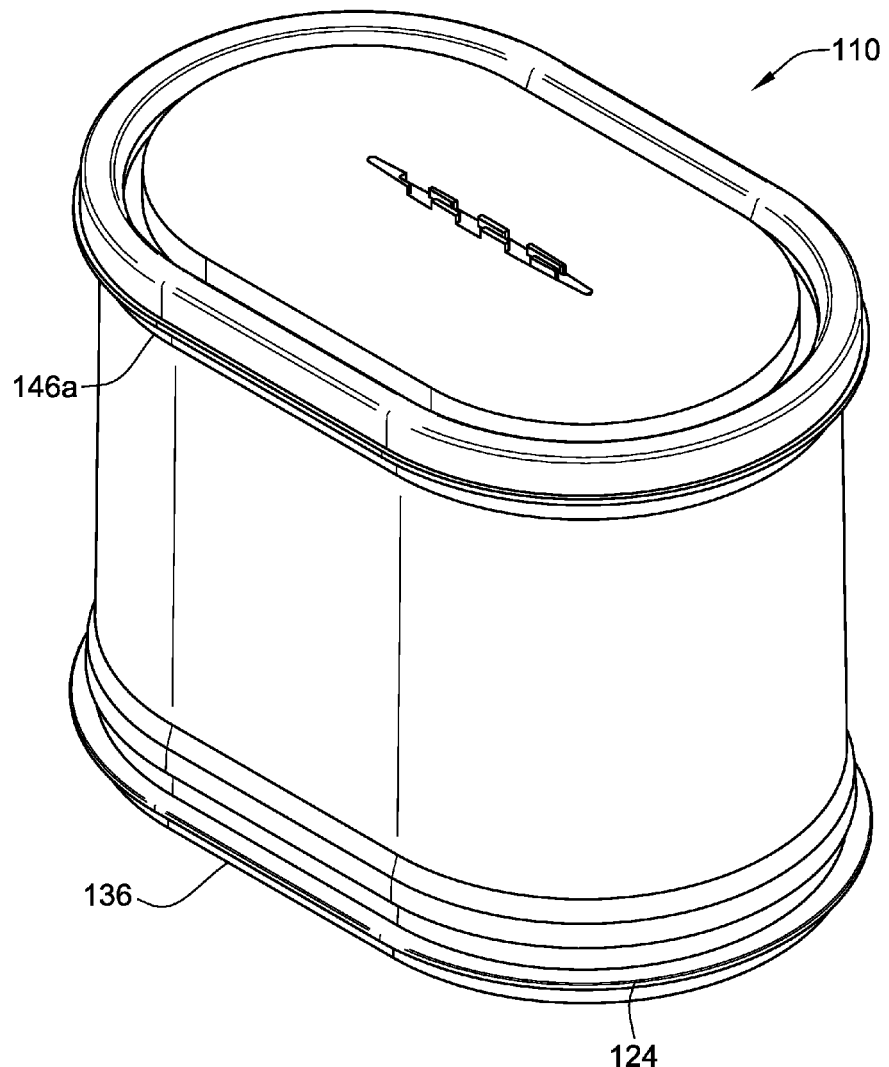
FIG. 8 is another isometric view of the filter element of FIG. 7, but taken from a different end perspective.

Turning to FIGS. 7-8, another alternative embodiment of a filter element 110 is illustrated sharing some similar aspects to that of the embodiment of FIGS. 1-5 and therefore the above description is generally applicable to this embodiment with some of the more notable distinctions discussed below and with similar reference numbers being used (but with a 100 number series). This filter element 110 likewise includes a fluted filter media pack 124 (or other inline straight through flow filter media) but in this embodiment it has an oval shape wound about a winding core 130 in the form of a truss like frame structure. This embodiment is adapted to seal against a duct 112, and in this case a radially inward seal in which urethane or other such seal material may compress radially outward. Further, in this embodiment the filter element may form part of the duct.

The media pack 124 includes an inlet flow face 136 and an outlet flow face 138. A seal support ring 140 supports a seal member 146 in which the terminating end face 146a thereof is generally flush with one of the flow faces—in this case outlet flow face 138, similar to the first embodiment. However, in contrast to the embodiment of FIG. 1, and as shown in FIGS. 7-8, the terminating end surface 146 of the seal support ring 140 here may be substantially recessed from the outlet flow face 138 as shown; and further an annular gap 147 is formed between the inner peripheral sealing surface of the seal member 146 and the outer peripheral surface of the filter media pack 124 so to provide a region to receive a corresponding seal surface of a sealing rim of the duct.

The seal support ring 140 is similarly connected to a mounting shell 148 that may interact and connect with upstream ductwork with a mounting profile and channel illustrated at the upstream end. An interface 154 between the ring 140, outer periphery of the filter media pack 124 (and optionally the mounting shell 148) is sealed with an annular bead of sealing adhesive (such as urethane, glue or the like) to preclude unfiltered fluid from short-circuiting and traveling between the outside periphery of the fluted filter media and the inside of the seal support ring. Upstream thereof, preferably at least one breather port 174 and liquid drain is provided to provide pressure equalization or to allow for drainage. Air entering the port 174 must still go through the filter media pack 124 to get to the outlet flow face 138.

Figure 9:
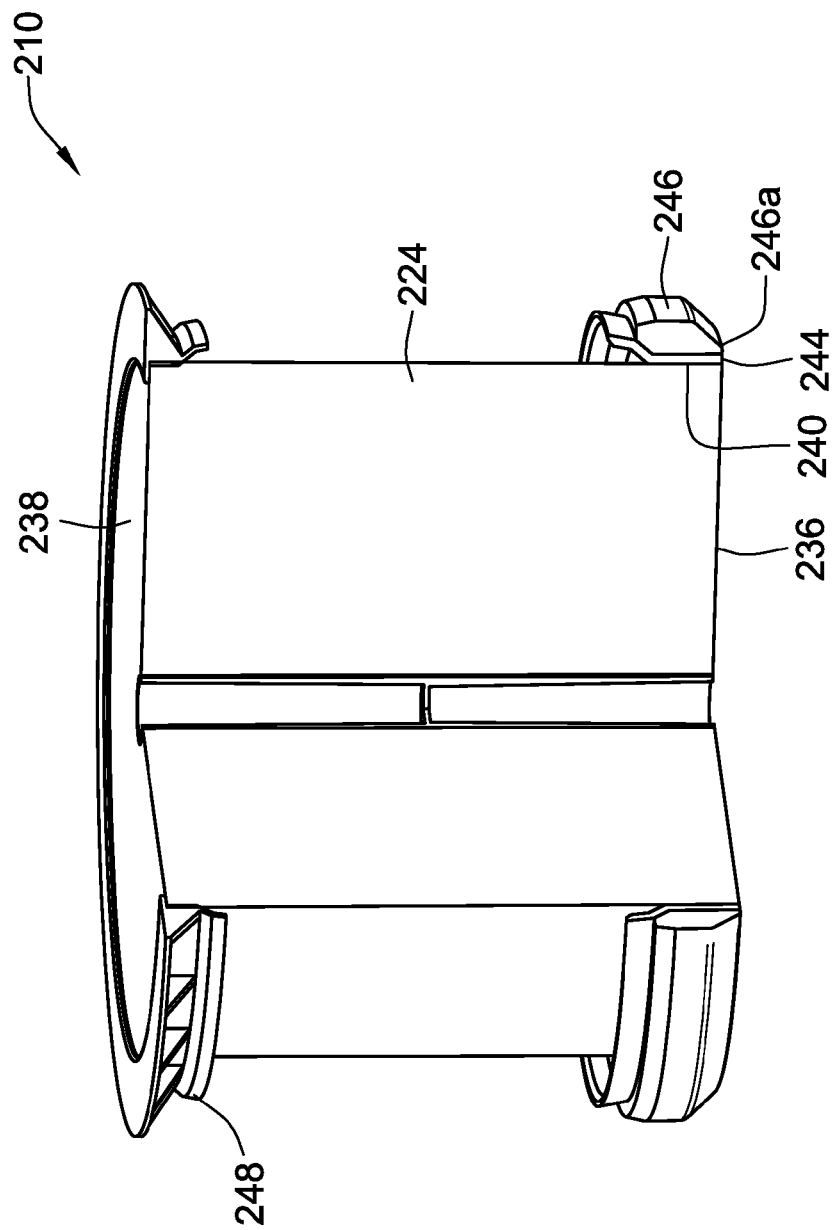
FIG. 9 is an isometric and partially cut cross-sectional view of a filter element according to yet another embodiment of the present invention.

Turning to FIG. 9, another alternative embodiment of a filter element 210 is illustrated sharing some similar aspects to that of the embodiment of FIGS. 1-5 and therefore the above description is generally applicable to this embodiment with some of the more notable distinctions discussed below and with similar reference numbers being used (but with a 200 number series). The media pack 224 which is a fluted media pack includes an inlet flow face 236 and an outlet flow face 238. A seal support ring 240 supports a seal member 246 in which the terminating end face 246a thereof is generally flush with one of the flow faces—in this case the inlet flow face 236, in contrast to the first embodiment. The terminating end surface 244 of the seal support ring 240 is also generally flush with the inlet flow face 236. In this embodiment the mounting shell 248 takes the form of a border ring member that may be used on the outlet face 238 and to radially position the filter within a housing that may be similar in some respect to FIG. 1, except that it may be fully contained with a reusable cover of the housing.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element, comprising:
a straight through flow filter media with inlet and outlet flow faces on opposed ends thereof and an outer peripheral surface extending between opposed ends, the straight through flow filter media adapted to be placed in-line in a fluid stream substantially without redirecting the flow;
a preformed seal support ring surrounding the outer peripheral surface and having a terminating end surface that is generally flush or recessed closely from within one of the inlet and outlet flow faces, the seal support ring generally confined between the inlet and outlet flow faces such that seal support ring does not extend over the inlet flow faces;
a seal member molded onto the seal support ring;
wherein the straight through flow filter media is a fluted filter media, the fluted filter media comprising a plurality of flutes extending between inlet and outlet flow faces with portions of flutes being closed such that fluid transverses through filter media as fluid flows from the inlet flow face to the outlet flow face;
further comprising a shell located off of and affixed to the preformed seal support ring, the shell having a housing locating device such that the housing locating device is spaced from the seal member a predetermined distance; and
wherein the fluted filter media projects substantially beyond an extent of the shell in a direction away from the seal support ring and seal member, thereby providing additional length for filtration capacity.

2. The filter element of claim 1, wherein the seal member is formed from foamed urethane and the preformed seal support ring is a plastic member.

3. The filter element of claim 1, wherein the seal member is generally flush with the terminating end surface of the seal support ring.

4. The filter element of claim 1, wherein the housing locating device comprises a flange with fasteners adapted to secure the filter element to a housing.

5. The filter element of claim 1 in combination with a housing to provide an air cleaner, the housing having annular internal sealing surface, the housing having an installation opening through which the filter element is received and removed, the housing having an annular wall extending between the installation opening and the annular internal sealing surface, the annular wall having a larger internal perimeter than the annular internal sealing surface such that the housing necks down from the annular wall to the annular internal sealing surface, and wherein the fluted filter media extending into the region contained radially within the annular internal sealing surface.

6. The filter element of claim 5, wherein the seal member forms a radial seal through compression of seal material with the housing.

7. A filter element, comprising:
a straight through flow filter media with inlet and outlet flow faces on opposed ends thereof and an outer peripheral surface extending between opposed ends, the straight through flow filter media adapted to be placed in-line in a fluid stream substantially without redirecting the flow;
a preformed seal support ring surrounding the outer peripheral surface, the seal support ring generally confined between the inlet and outlet flow faces such that the seal support ring does not extend over the inlet or outlet flow faces;
a seal member molded onto the seal support ring, the seal member having a terminating seal surface that is generally flush with one of the inlet and outlet flow faces, the seal member surrounding the outer peripheral surface of the filter media;

further comprising a shell located off of and affixed to the preformed seal support ring, the shell having a housing locating device such that the housing locating device is spaced from the seal member a predetermined distance; and wherein the fluted filter media projects substantially beyond an extent of the shell in a direction away from the support ring and seal member, thereby providing additional length for filtration capacity.

8. The filter element of claim 7, wherein the straight through flow filter media is a fluted filter media, the fluted filter media comprising a plurality of flutes extending between inlet and outlet flow faces with portions of flutes being closed such that fluid transverses through filter media as fluid flows from the inlet flow face to the outlet flow face.

9. The filter element of claim 8, wherein the seal member forms a radial seal through compression of seal material with a housing or duct sealing surface.

10. The filter element of claim 9, further comprising an annular radial clearance gap between the seal member and the outer peripheral surface of the fluted filter media.

11. A method of making a filter element comprising:
forming a straight through flow filter media pack with inlet and outlet flow faces on opposed ends thereof and an outer peripheral surface extending between opposed ends, the straight through flow filter media adapted to be placed in-line in a fluid stream substantially without redirecting the flow;
molding a seal member on a preformed seal support ring such that the seal member is generally flush with the terminating end of the support ring;
arranging the filter media pack within the seal support ring such that the seal support ring extends over the outer peripheral surface until the terminating end of the support ring co-locates along a flat surface to be generally flush with one of the inlet and outlet flow faces;
affixing the seal support ring to the outer peripheral surface of the filter media pack;
further comprising affixing a shell located of and affixed to the preformed seal support ring, the shell having a housing locating device such that the housing locating device is spaced from the seal member a predetermined distance and such that the filter media pack projects substantially beyond an extent of the shell in a direction away from the seal support ring and seal member, thereby providing additional length for filtration capacity.

12. The method of claim 11, wherein the forming comprises coiling a fluted filter media to comprise a plurality of flutes extending between inlet and outlet flow faces with portions of flutes being closed such that fluid transverses through filter media as fluid flows from the inlet flow face to the outlet flow face.

13. The method of claim 12, wherein said molding is conducted prior to said arranging, and wherein said affixing of said seal support ring is conducted after said arranging.

14. The filter element of claim 1, further comprising at least one adhesive bead radially interposed between the outer peripheral surface and an inner peripheral surface of the seal support ring for affixing the seal support ring to the filter media.

15. The filter element of claim 7, further comprising at least one adhesive bead radially interposed between the outer peripheral surface and an inner peripheral surface of the seal support ring for affixing the seal support ring to the filter media.

16. The method of claim 11, further comprising applying at least one adhesive bead on an inner peripheral surface of the seal support ring for affixing the seal support ring to the outer peripheral surface of the filter media.

17. The filter element of claim 1, wherein the seal support ring defines an opening which is at least as large as the outlet flow face such that the outlet flow face can be received through the opening.

18. The filter element of claim 7, wherein the seal support ring defines an opening which is at least as large as the outlet flow face such that the outlet flow face can be received through the opening.

19. The method of claim 11, further comprising preforming the seal support ring such that it defines an opening which is at least as large as the outlet flow face such that the outlet flow face can be received through the opening.

20. The filter element of claim 7, wherein the seal member is formed from foamed urethane and the seal support ring is a plastic member.

21. The method of claim 11, further comprising the step of preforming the seal support ring such that it is made of plastic, and wherein molding the seal member on the seal support ring includes molding the seal member of a urethane material.

* * * * *